UNITED STATES PATENT OFFICE.

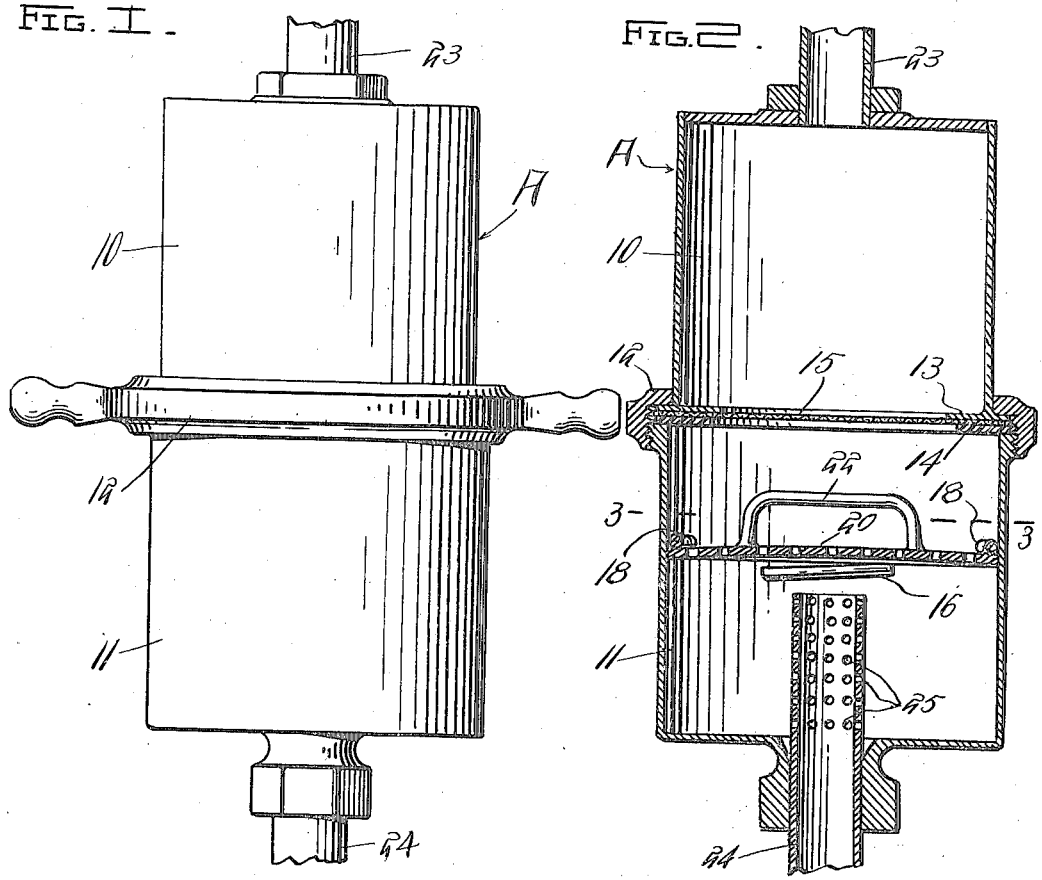

ALEXANDER ALMASY AND JOSEPH BACHA, OF CHROME, NEW JERSEY.

BEER-STRAINER.

1,190,841.

Specification of Letters Patent. Patented July 11, 1916.

Application filed June 7, 1915. Serial No. 32,764.

*To all whom it may concern:*

Be it known that we, ALEXANDER ALMASY and JOSEPH BACHA, citizens of the United States, residing at Chrome, in the county of Middlesex, State of New Jersey, have invented certain new and useful Improvements in Beer-Strainers; and we do hereby declare the following to be a full, clear, and exact description of the invention, such as will enable others skilled in the art to which it appertains to make and use the same.

This invention relates to beer strainers.

The object of the invention resides in the provision of a device of the character named adapted to be incorporated in a beer dispensing system between the supply and the dispensing faucet for the purpose of separating all solid impurities from the beer and trapping same.

A further object of the invention resides in the provision of a beer strainer embodying an improved construction whereby same may be easily cleaned by separating the component parts thereof.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a view in elevation showing the strainer included in the pipe of a beer dispensing system; Fig. 2, a vertical section through the strainer; Fig. 3, a section on the line 3—3 of Fig. 2, and Fig. 4, a perspective view of the coarse screen employed in the device.

Referring to the drawings the invention is shown as comprising a casing A formed of sections 10 and 11 detachably connected together by means of a union 12. The casing A is preferably cylindrical and the inner end of the section 10 is provided with an interior flange 13 which forms a seat for a gasket 14 and for the periphery of a fine mesh screen 15, said gasket and screen being clamped between the adjacent ends of the sections 10 and 11 as will be obvious, the gasket affording a liquid type joint between the sections 10 and 11. Mounted on the inner wall of the section 11 at diametrically opposite points are ledge members 16 and 17, while additional ledge members 18 and 19 are mounted on the inner wall of the section at diametrically opposite points and in a plane slightly above the plane of the ledge members 16 and 17. The ledge members 16 and 17 support a coarse screen 20 which is provided at diametrically opposite points with recesses 21. This screen 20 has attached thereto a suitable handle 22 for the purpose of facilitating the application of same. To apply the screen 20 within the section 11 the recesses 21 are disposed in line with the ledge members 18 and 19 and moved into engagement with the ledge members 16 and 17. The screen is then rotated to dispose the recesses 21 out of alinement with the ledge members 18 and 19 and in this manner the screen 20 is locked within the section 11. A pipe 23 has one end mounted in the outer end of the section 10 and leads to the dispensing faucet of the system. Another pipe 24 is engaged through the outer end of the section 11 and projects a considerable distance into said section. The portion of the pipe 24 disposed within the section 11 is provided with perforations 25. It will be understood that the pipe 24 leads from the beer supply. By providing the perforations 25 it will be obvious that when the system is flushed with water the latter can be entirely drained from the trap which is formed by projecting the pipe 24 into the section 11.

It will be noted that by perforating the pipe 24 within the section 11 and disposing the lowermost perforations 25 above the bottom of the section the rosin which has become separated from the wood of the barrel is prevented from returning back when a new barrel is being tapped. Furthermore by perforating the pipe 24 and then carrying the beer through the screens 20 and 15 the necessary foam will be maintained even though the beer has been standing for some time.

What is claimed is:—

1. A strainer for beer dispensing system comprising a casing formed of detachably connected upper and lower sections, an outlet pipe leading from the outer end of the upper section an inlet pipe projecting through the outer end of the lower section and extending a predetermined distance into the latter, the portion of the inlet pipe disposed within the lower section being provided with a plurality of perforations, a fine screen clamped between the adjacent ends of said sections, and a coarse screen removably mounted in the lower section.

2. A strainer for a beer dispensing system comprising a casing formed of detachably connected upper and lower sections, an outlet pipe leading from the outer end of the upper section, an inlet pipe leading from the outer end of the lower section, a relatively fine screen clamped between the adjacent ends of said sections, helical supporting lugs on the inner face of the lower section, locking lugs on the inner face of the lower section and spaced above the supporting lugs, and a perforated straining plate having its lower side engaged with the supporting lugs and its upper side with the locking lugs, said plates having recesses therein adapted to be brought into registration with the locking lugs by rotation of the plate to permit removal of the latter.

In testimony whereof, we affix our signatures in the presence of two witnesses.

ALEXANDER ALMASY.
JOSEPH BACHA.

Witnesses:
J. E. Lowe,
H. Pross.